(12) United States Patent
Inui

(10) Patent No.: US 12,222,696 B2
(45) Date of Patent: Feb. 11, 2025

(54) CONTROLLER, CONTROL SYSTEM, AND CONTROL METHOD

(71) Applicant: OMRON CORPORATION, Kyoto (JP)

(72) Inventor: Tomonari Inui, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 386 days.

(21) Appl. No.: 17/597,105

(22) PCT Filed: Mar. 3, 2020

(86) PCT No.: PCT/JP2020/008911
§ 371 (c)(1),
(2) Date: Dec. 27, 2021

(87) PCT Pub. No.: WO2021/005829
PCT Pub. Date: Jan. 14, 2021

(65) Prior Publication Data
US 2022/0236711 A1    Jul. 28, 2022

(30) Foreign Application Priority Data
Jul. 8, 2019   (JP) .................. 2019-126704

(51) Int. Cl.
*G05B 19/05*      (2006.01)
(52) U.S. Cl.
CPC ......... *G05B 19/052* (2013.01); *G05B 19/056* (2013.01); *G05B 19/058* (2013.01); *G05B 2219/2241* (2013.01)
(58) Field of Classification Search
CPC .. G05B 19/052; G05B 19/056; G05B 19/058; G05B 2219/2241; G06F 11/1443; G06F 11/302; G06F 11/3476
See application file for complete search history.

(56) References Cited

U.S. PATENT DOCUMENTS

| 2003/0055826 A1 | 3/2003 | Graham |
| 2009/0030951 A1 | 1/2009 | Morita |

(Continued)

FOREIGN PATENT DOCUMENTS

| CN | 101395547 A | 3/2009 |
| CN | 103995500 A | 8/2014 |

(Continued)

OTHER PUBLICATIONS

International Search Report for PCT/JP2020/008911 dated, Apr. 14, 2020 (PCT/ISA/210).

(Continued)

*Primary Examiner* — Christopher W Carter
(74) *Attorney, Agent, or Firm* — Sughrue Mion, PLLC

(57) ABSTRACT

A controller for controlling a control object includes a communication interface, an instruction executor, and an access processor. The communication interface accesses a database device. The instruction executor executes a user program including an access instruction for accessing the database device, the user program being associated with control of the control object. The access processor generates an access request in response to execution of the access instruction and causes the communication interface to transmit the access request. The access processor extracts an access request satisfying a prescribed condition from an error list including access requests recorded when access to the database device fails and causes the communication interface to retransmit the access request extracted.

17 Claims, 17 Drawing Sheets

(56) References Cited

U.S. PATENT DOCUMENTS

| | | | |
|---|---|---|---|
| 2009/0307557 A1* | 12/2009 | Rao | H04L 1/1874 |
| | | | 714/749 |
| 2014/0136570 A1 | 5/2014 | Okamura et al. | |
| 2014/0236914 A1 | 8/2014 | Okamura et al. | |
| 2014/0236997 A1 | 8/2014 | Okamura et al. | |
| 2016/0125030 A1* | 5/2016 | Adachi | G06F 16/27 |
| | | | 707/716 |

FOREIGN PATENT DOCUMENTS

| | | |
|---|---|---|
| CN | 109739806 A | 5/2019 |
| JP | 8-087310 A | 4/1996 |
| JP | 2005-33578 A | 2/2005 |
| JP | 2012-108642 A | 6/2012 |
| JP | 2014-157483 A | 8/2014 |
| JP | 2014-197346 A | 10/2014 |

OTHER PUBLICATIONS

Written Opinion of the International Searching Authority for PCT/JP2020/008911 dated, Apr. 14, 2020 (PCT/ISA/237).
Extended European Search Report issued Jun. 20, 2023 in European Application No. 20836957.9.
Office Action issued Jan. 15, 2024 in Chinese Application No. 202080046727.7.
Communication issued Aug. 20, 2024 in Chinese Application No. 202080046727.7.

* cited by examiner

FIG.9

| SQL CATEGORY | DOMAIN | DOMAIN PATH | EXTRACTION CONDITION |
|---|---|---|---|
| INSERT | SPOOL | /spool/ | TIME |
| UPDATE | OPERATION LOG | /fs/MEMORYCARD/DBConnection | CONNECTION NAME |
| SELECT | DATABASE | ... | TABLE NAME |
| DELETE | SD CARD | | PROCEDURE NAME |
| BATCHINSERT | ... | | ... |
| STOREDPROCEDURE | | | ALL CONDITIONS |
| ... | | | |

CONTROLLER, CONTROL SYSTEM, AND CONTROL METHOD

CROSS REFERENCE TO RELATED APPLICATIONS

This application is a National Stage of International Application No. PCT/JP2020/008911 filed Mar. 3, 2020, claiming priority based on Japanese Patent Application No. 2019-126704 filed Jul. 8, 2019, the entire contents of each of which being herein incorporated by reference in their entireties.

TECHNICAL FIELD

The present invention relates to a controller for controlling a control object, a control system including the controller, and a control method to be executed by the controller.

BACKGROUND ART

Control objects such as machines and facilities used in many production sites are controlled by controllers such as programmable controllers (Programmable Logic Controller; hereinafter, also referred to as "PLC"). With improvements in information processing technology, such controllers are becoming more multifunctional.

For example, Japanese Patent Laying-Open No. 2012-108642 (PTL 1) discloses a data collection system that stores predetermined data collected by a control device such as a programmable controller (PLC) in a database. Such a programmable controller includes an SQL transmitter that transmits, to the database over a communication path, a set of SQL processing including a plurality of SQL statements for accessing the database.

CITATION LIST

Patent Literature

PTL 1: Japanese Patent Laying-Open No. 2012-108642

SUMMARY OF INVENTION

Technical Problem

Such a contoller issues an access request for writing data to a database device or deleting data on the database device. As such an access request, an SQL statement used in a relational database management system is typically well known.

In a controller such as a PLC, such an access request is typically generated and transmitted through execution of a user program designed to adapt to a control object. In such a configuration where the user program is used to issue the access request, the user program is often designed, while taking reusability of the program into account, to allow the range of data to be written or deleted to be designated using a variable (parameter).

An error may occur in access (connection) to the database. It is desirable that flexible recovery from such an error can be made.

It is therefore an object of the present disclosure to provide a controller capable of making flexible recovery from an error in connection to a database, a control system including the controller, and a control method to be executed by the controller.

Solution to Problem

A controller according to an example of the present disclosure is a controller for controlling a control object, the controller including a communication interface configured to access a database device, an instruction execution unit configured to execute a user program including an access instruction for accessing the database device, the user program being associated with control of the control object, and an access processing unit configured to generate an access request in response to execution of the access instruction by the instruction execution unit and cause the communication interface to transmit the access request, and the access processing unit extracts an access request satisfying a prescribed condition from an error list including access requests recorded when access to the database device fails and causes the communication interface to retransmit the access request thus extracted.

According to this configuration, the access processing unit can extract only the access request satisfying a retransmission condition from the error list and retransmit the access request to a database device. It is therefore possible to provide a controller that can make flexible recovery from an error in connection to a database.

The access request may typically be an SQL statement used in a relational database management system.

It is preferable that the instruction execution unit instruct, in response to input from a user for settings of the prescribed condition, the access processing unit to extract the access request satisfying the prescribed condition.

According to this configuration, it is possible to select an access request satisfying an extraction condition set by the user. It is therefore possible to provide a controller that can suitably make recovery from an error in connection to a database.

It is preferable that the instruction execution unit executes the user program designed to display information indicating the access request extracted from the error list by the access processing unit, and instructs, in response to input from a user for selection of the access request, the access processing unit to cause the communication interface to retransmit the access request selected by the user.

According to this configuration, the user can check the access request to be selected from a plurality of access requests satisfying the extraction condition.

It is preferable that when the communication interface successfully retransmits the access request, the access processing unit deletes the access request from the error list.

According to this configuration, once the access request is successfully retransmitted, it is possible to prevent the access request from being repeatedly retransmitted.

It is preferable that when the communication interface fails to retransmit the access request, the access processing unit generates information on the failure of the retransmission.

According to this configuration, it is possible to keep track of the results of retransmission of access requests.

A control system according to an example of the present disclosure includes any one of the above-described controllers, and a database device configured to receive an access request from the controller.

According to this configuration, it is possible to provide a control system that can make flexible recovery from an error in connection to a database.

A control method according to an example of the present disclosure is a control method to be executed by a controller for controlling a control object, the control method including executing, by the controller, an access instruction for accessing a database device, generating, by the controller, an access request, transmitting, by the controller, the access request to the database device, storing, by the controller, an access request used when access to the database device fails in an error list, extracting, by the controller, an access request satisfying a prescribed condition from the error list, and retransmitting, by the controller, the access request extracted to the database device.

According to this configuration, it is possible to provide a control method that allows flexible recovery from an error in connection to a database to be made.

Advantageous Effects of Invention

According to the present invention, it is possible to prevent an inappropriate access request from being generated and transmitted through execution of a user program.

BRIEF DESCRIPTION OF DRAWINGS

FIG. 9 is a diagram illustrating information input to the function block illustrated in FIG. 8.

DESCRIPTION OF EMBODIMENTS

Figure 1:
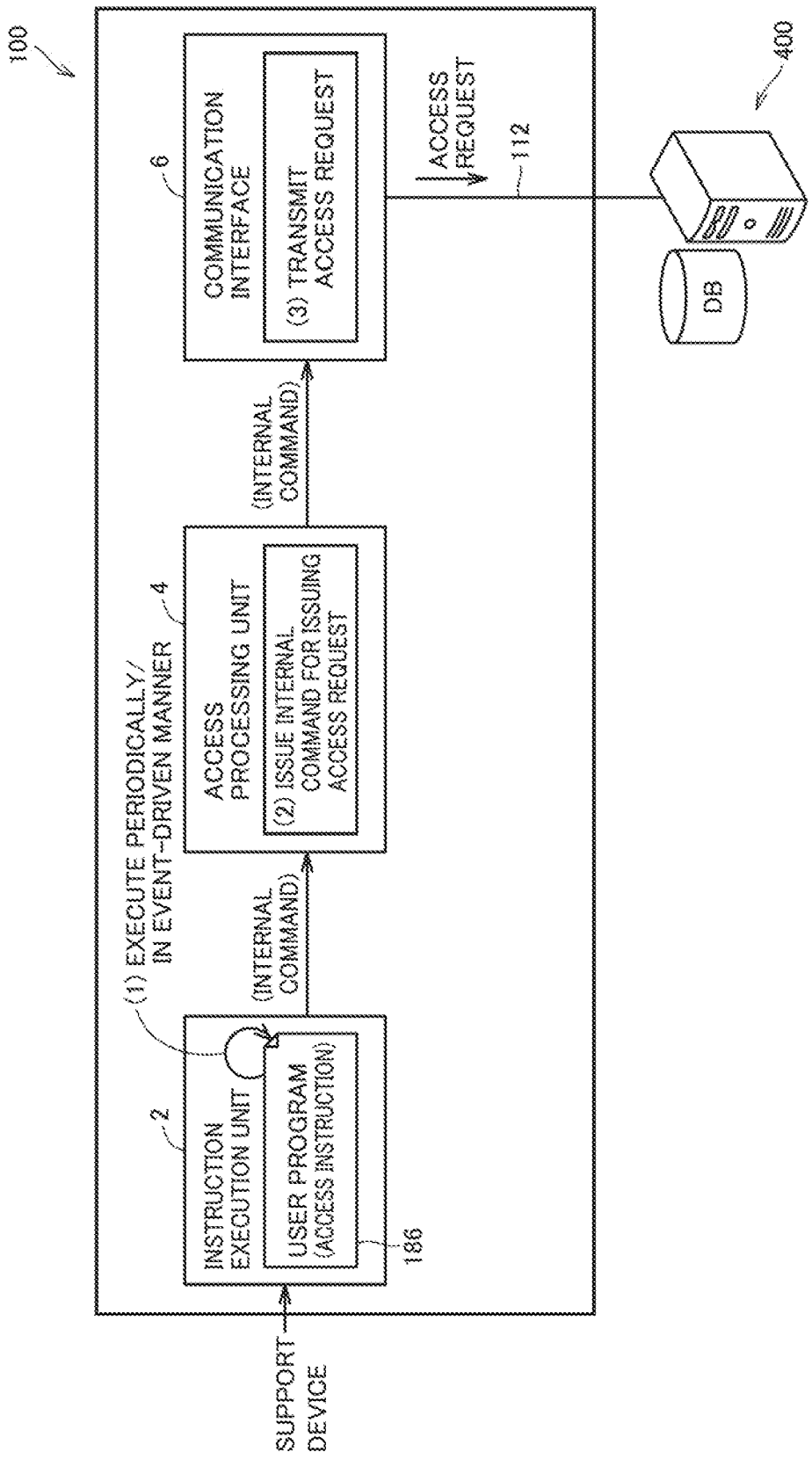
FIG. 1 is a diagram for describing a functional outline of a PLC according to the present embodiment.

Embodiments according to the present invention will be described in detail with reference to the drawings. Note that the same or corresponding parts in the drawings are denoted by the same reference numerals, and no redundant description will be given of such parts.

A. Outline

First, a description will be given of the outline of a controller according to the present embodiment from the functional point of view. In the following description, a programmable controller (PLC) that controls a control object such as a machine or a facility will be described as a specific example of the controller. Note that the controller according to the present embodiment is not limited to such a PLC, and any controller or information processing device is applicable.

FIG. 1 is a diagram for describing a functional outline of a PLC 100 according to the present embodiment. Referring to FIG. 1, PLC 100 is configured to transmit and receive data to and from a database device 400. That is, PLC 100 and database device 400 are capable of exchanging data with each other over a network 112 such as Ethernet (registered trademark).

More specifically, PLC 100 includes an instruction execution unit 2, an access processing unit 4, and a communication interface 6. Some or all of the components may be implemented by a program executed by a processor as described later, or alternatively may be implemented by dedicated hardware. That is, the components illustrated in FIG. 1 are schematically represented from the functional point of view, and how to implement each component is not limited to any specific method.

Instruction execution unit 2 executes a user program 186 associated with control of the control object such as a machine or a device. Basically, instruction execution unit 2 executes user program 186 periodically or in an event-driven manner. That is, PLC 100 is configured to control the control object by repeatedly executing user program 186. User program 186 is typically created and transmitted to PLC 100 by a support device 300 (to be described later). User program 186 executed by instruction execution unit 2 may include an instruction (access instruction) for accessing database device 400, and in this case, when the access instruction is executed, an internal command for requesting access to database device 400 is issued to access processing unit 4.

Upon receipt of the internal command for requesting access to database device 400 from instruction execution unit 2, access processing unit 4 issues, to communication interface 6, an internal command necessary for issuing an access request to database device 400. That is, access processing unit 4 causes communication interface 6 to transmit the access request in response to the execution, by instruction execution unit 2, of the access instruction for accessing database device 400 included in user program 186. That is, a system program 188 includes instructions for processing of generating the access request for database device 400 in accordance with information where an access range is designated and processing of executing the access request via communication interface 6 when the access instruction is executed in response to the execution of user program 186.

Communication interface 6 generates a command (request) necessary for communicating with database device 400 in accordance with the internal command issued from access processing unit 4, and transmits the command (request) over network 112. Further, communication interface 6 receives data (execution result) transmitted from database device 400 or the like over network 112.

The processing up to the transmission of the access request to the database device in PLC 100 illustrated in FIG. 1 includes: (1) executing, by instruction execution unit 2, user program 186 periodically or in an event-driven manner; (2) issuing, by access processing unit 4, the internal command for issuing the access request in response to the execution of the access instruction included in user program 186; and (3) transmitting, by communication interface 6, the access request in response to the internal command issued by access processing unit 4.

Next, PLC 100 according to the present embodiment and functions implemented in PLC 100 will be described in more detail.

B. System Configuration

Figure 2:
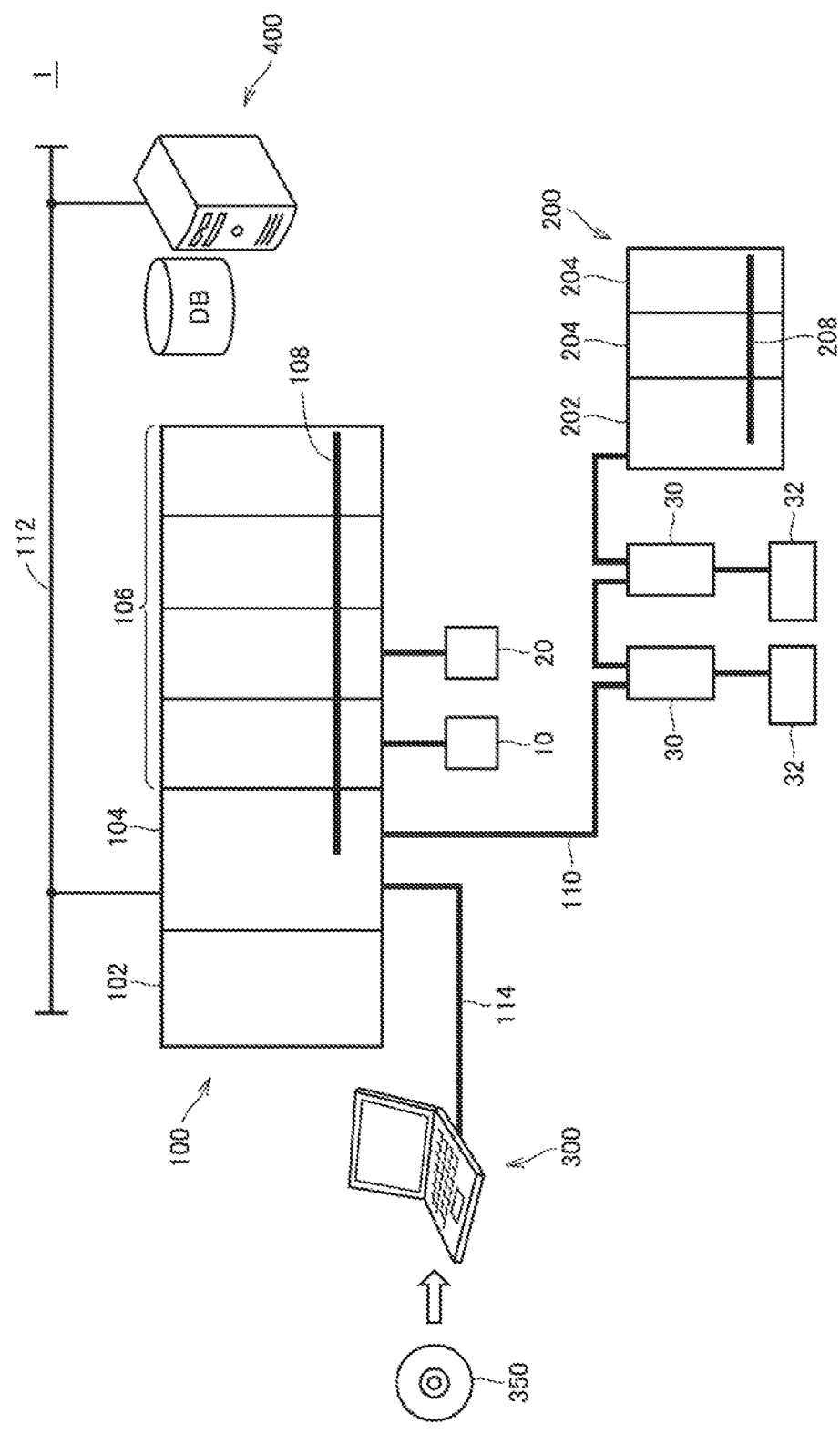
FIG. 2 is a diagram schematically illustrating a system configuration of a control system 1 including the PLC according to the present embodiment.

FIG. 2 is a diagram schematically illustrating a system configuration of a control system 1 including PLC 100 according to the present embodiment. Referring to FIG. 2, control system 1 includes PLC 100, support device 300 connected to PLC 100, and database device 400 that receives access from PLC 100. PLC 100 executes the user program periodically or in an event-driven manner. When the access instruction included in this user program is executed, the processing for database device 400 is executed.

Support device 300 is a typical example of an information processing device that generates the user program to be executed by PLC 100. Furthermore, support device 300 is connected to PLC 100 over a connection cable 114, and provides functions such as setting various parameters, programming, monitoring, and debugging in cooperation with PLC 100.

PLC 100 includes a CPU unit 104 responsible for executing a control operation and one or more input/output (IO) units 106. Such units are capable of exchanging data with each other over a PLC system bus 108. Further, the units receive power with a suitable voltage from a power supply unit 102.

In control system 1, PLC 100 exchanges data with various field machines via IO units 106 (connected over PLC system bus 108) and/or over a field bus 110. Examples of such field machines include an actuator responsible for performing some processing on the control object, a sensor responsible for acquiring various information from the control object, and the like. FIG. 2 illustrates a detection switch 10, a relay 20, and a servomotor driver 30 that drives a motor 32 as examples of such field machines. A remote IO terminal 200 is further connected to PLC 100 over field bus 110. Remote IO terminal 200 is primarily responsible for performing processing related to general input/output processing in the same manner as IO unit 106. More specifically, remote IO terminal 200 includes a communication coupler 202 responsible for performing processing related to data transmission over field bus 110, and one or more IO units 204. Such units are capable of exchanging data with each other over a remote IO terminal bus 208.

C. Configuration of PLC 100

Figure 3:
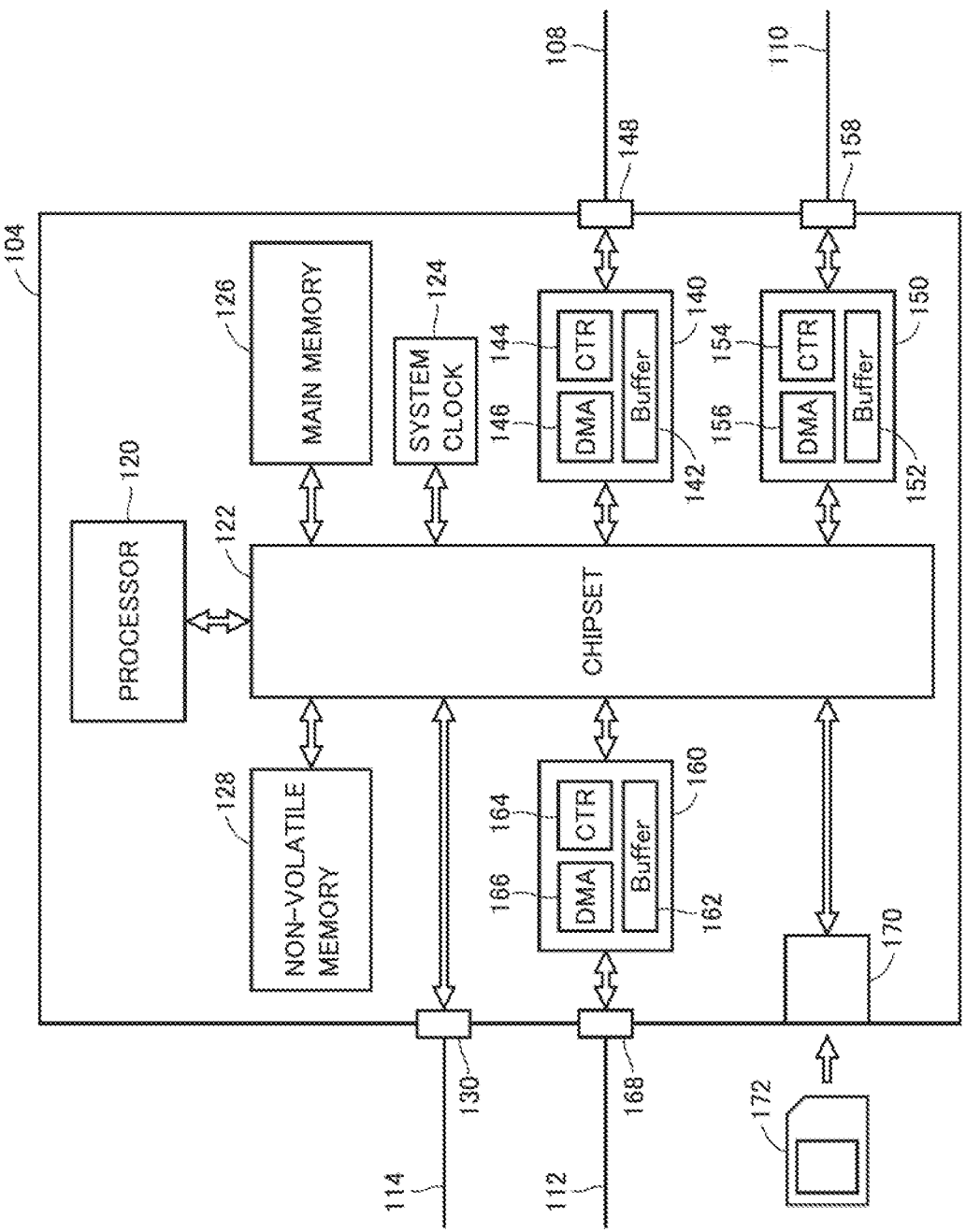
FIG. 3 is a diagram schematically illustrating a hardware configuration of a core part of the PLC according to the present embodiment.
Figure 4:
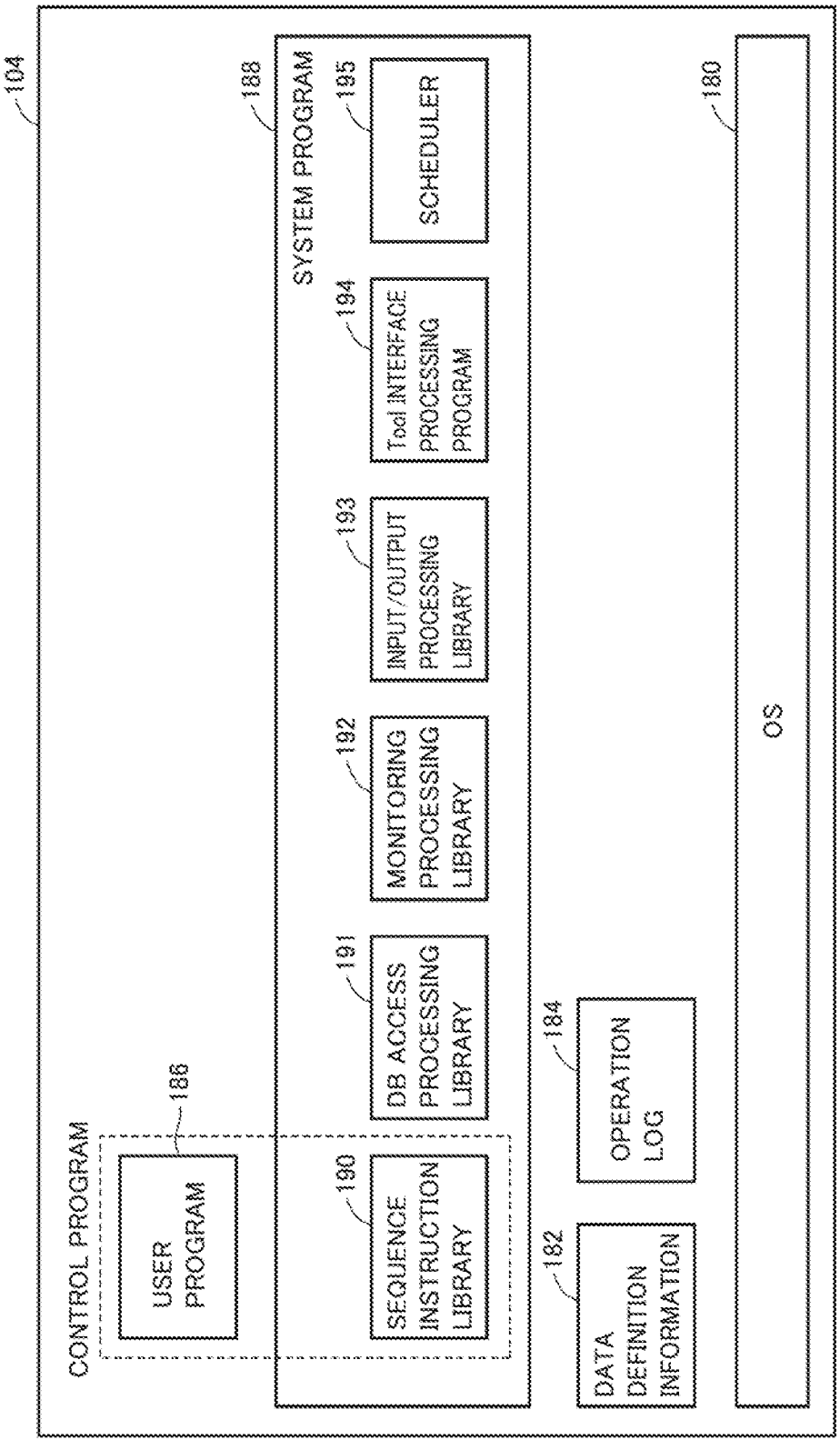
FIG. 4 is a diagram schematically illustrating an example of a software configuration of the PLC according to the present embodiment.

Next, a configuration of PLC 100 according to the present embodiment will be described. FIG. 3 is a diagram schematically illustrating a hardware configuration of a core part of PLC 100 according to the present embodiment. FIG. 4 is a diagram schematically illustrating an example of a software configuration of PLC 100 according to the present embodiment.

Referring to FIG. 3, a description will be given of a hardware configuration of CPU unit 104 of PLC 100. CPU unit 104 includes a processor 120, a chipset 122, a system clock 124, a main memory 126, a non-volatile memory 128, a communication connector 130, a PLC system bus controller 140, a field bus controller 150, and an upper-level communication controller 160, and a memory card interface 170. Chipset 122 and other components are connected to each other over various buses.

Processor 120 and chipset 122 typically adhere to a general-purpose computer architecture. That is, processor 120 interprets and executes instruction code sequentially supplied from chipset 122 in accordance with an internal clock. For the sake of simplicity, only a single processor 120 is illustrated, but the configuration is not limited to such a configuration, and any desired configuration may be employed. For example, a configuration including a plurality of processors each including a single core, a configuration including a plurality of single processors, a configuration including a plurality of processors each including a plurality of cores, or the like may be employed. That is, the controller according to the present embodiment may be implemented by a program executed by one or more processors.

Chipset 122 exchanges internal data with various connected components and generates instruction code necessary for processor 120. System clock 124 generates a system clock at predetermined intervals and provides the system clock to processor 120. Chipset 122 is capable of caching data and the like obtained as a result of performing an operation by processor 120.

CPU unit 104 includes main memory 126 and non-volatile memory 128 as storage means. Main memory 126 is a volatile storage area that not only stores various programs to be executed by processor 120 but is used as a work memory during execution of various programs. Non-volatile memory 128 stores, in a non-volatile manner, an operating system (OS), a system program, a user program, data definition information, log information, and the like.

Communication connector 130 is an interface for connecting support device 300 and CPU unit 104 over connection cable 114. Typically, an executable program or the like transferred from support device 300 is captured by CPU unit 104 via communication connector 130. Communication connector 130 is a USB connector as an example, but the communication standard and the type of communication connector 130 adhering to the standard are not particularly limited.

CPU unit 104 includes PLC system bus controller 140, field bus controller 150, and upper-level communication controller 160 as communication means. Such communication circuits are responsible for transmitting and receiving data.

PLC system bus controller 140 controls data exchanges over PLC system bus 108. More specifically, PLC system bus controller 140 includes a buffer memory 142, a PLC system bus control circuit 144, and a dynamic memory access (DMA) control circuit 146. PLC system bus controller 140 is connected to PLC system bus 108 via a PLC system bus connector 148.

Field bus controller 150 includes a buffer memory 152, a field bus control circuit 154, and a DMA control circuit 156. Field bus controller 150 is connected to field bus 110 via a field bus connector 158. Upper-level communication controller 160 includes a buffer memory 162, an upper-level communication control circuit 164, and a DMA control circuit 166. Upper-level communication controller 160 is connected to network 112 via an upper-level communication connector 168.

Memory card interface 170 connects a memory card 172 removable from CPU unit 104 and processor 120.

Next, referring to FIG. 4, a description will be given of a software configuration for implementing various functions provided by PLC 100 according to the present embodiment. Instruction code included in such software is read at appropriate timing and executed by processor 120 of CPU unit 104.

Referring to FIG. 4, the software executed by CPU unit 104 has three layers, an OS 180, system program 188, and user program 186.

OS 180 provides a basic runtime environment for processor 120 to execute system program 188 and user program 186.

System program 188 is a set of software for providing basic functions of PLC 100. Specifically, system program 188 includes a sequence instruction library 190, a database (DB) access processing library 191, a monitoring processing library 192, an input/output processing library 193, a Tool interface processing program 194, and a scheduler 195.

On the other hand, user program 186 is a program created, as desired, to adapt to a control purpose for the control object. That is, user program 186 is designed, as desired, to adapt to a target line (process) to be controlled by control system 1.

User program 186 cooperates with sequence instruction library 190 to execute a control purpose for a user. That is, user program 186 allows programmed operation to be made using instructions, functions, function modules, and the like provided by sequence instruction library 190. Therefore, user program 186 and sequence instruction library 190 may be collectively referred to as a "control program".

Such programs, libraries, and the like are stored in non-volatile memory 128. That is, non-volatile memory 128 corresponds to a memory that stores system program 188 and user program 186.

Data definition information 182 includes definitions for treating, as unique variables, data (input data, output data, internal data) to be referenced during the execution of user program 186 or the like. When a predetermined event occurs during the execution of system program 188 and user program 186, information on the event that has occurred is stored in an operation log 184 with the event associated with time information. That is, various information obtained during the execution of system program 188 and/or user program 186 is stored in operation log 184 as a log (history information).

Next, each of the programs will be described in more detail.

Sequence instruction library 190 includes a set of instruction code for calling the body of the sequence instruction designated in user program 186 and implementing the content of the instruction during the execution of user program 186.

DB access processing library 191 includes a set of instruction code for implementing processing necessary for accessing database device 400 during the execution of user program 186. DB access processing library 191 includes execution code corresponding to instructions that can be designated in user program 186.

Monitoring processing library 192 is a program for implementing an access request restriction function according to the present embodiment. Details of the function provided by monitoring processing library 192 will be described later.

Input/output processing library 193 is a program for controlling reception of input data and transmission of output data between IO unit 106 and various field machines.

Tool interface processing program 194 provides an interface for exchanging data with support device 300.

Scheduler 195 creates a thread or procedure for executing the control program in accordance with a predetermined priority, a system timer value, or the like.

As described above, user program 186 is created to adapt to the control purpose (for example, the target line or process) designated by the user. User program 186 is typically a program in the object file format that is executable by processor 120 of CPU unit 104. User program 186 is generated from a source program compiled by support device 300 or the like, the source program being written in the ladder format or the function block format. Then, the user program in the object file format thus generated is transferred from support device 300 to CPU unit 104 and stored in non-volatile memory 128 or the like.

In the above description, an embodiment where, in order to execute user program 186 stored in the memory, processor 120 reads the system program and executes the programs included in DB access processing library 191 and monitoring processing library 192 in the system program has been given as an example. However, as long as a configuration including a program responsible for transmission and reception of the access request for the database device in response to the execution of the access instruction (for example, a database connection service) and a program responsible for monitoring information where the range of access to the database in response to the execution of the instruction is designated (for example, a monitoring service) defined in user program 186 is provided, it is not limited to the above-described embodiment.

D. Configuration of Support Device 300

Next, support device 300 according to the present embodiment will be described. Support device 300 is configured to assist in using CPU unit 104 of PLC 100, and provides functions such as setting various parameters, programming, monitoring, and debugging in cooperation with PLC 100.

Figure 5:
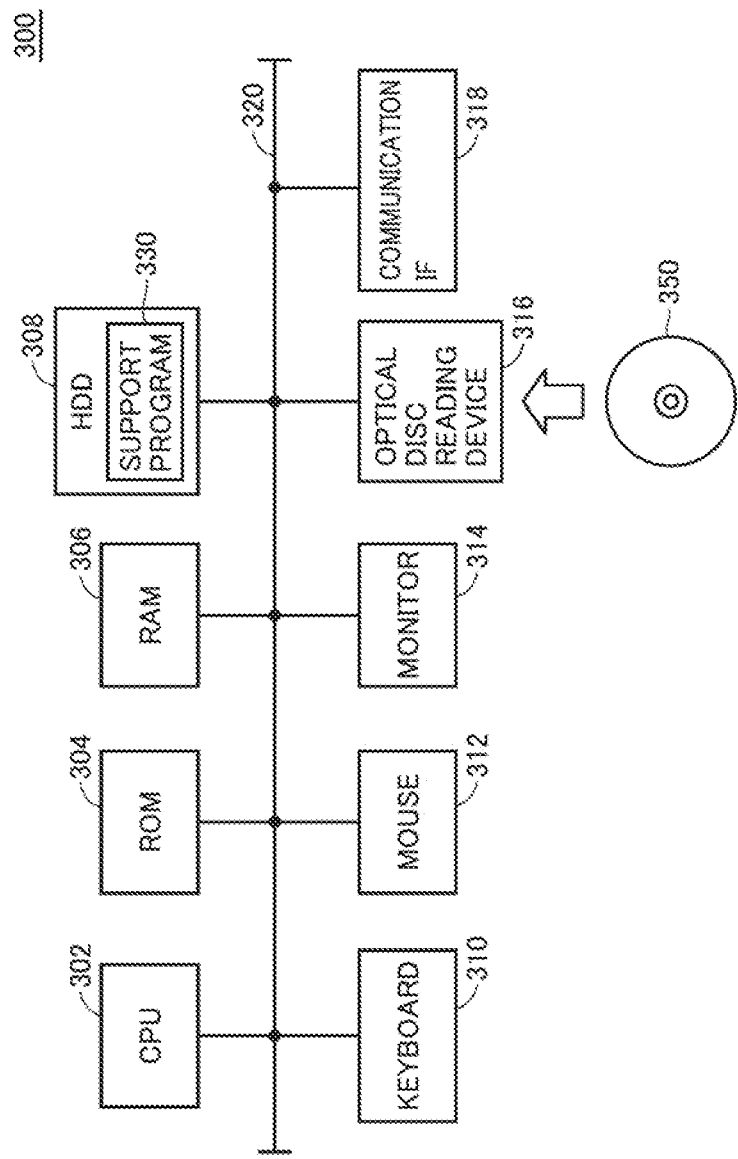
FIG. 5 is a diagram schematically illustrating a hardware configuration of a support device used with being connected to the PLC according to the present embodiment.

FIG. 5 is a diagram schematically illustrating a hardware configuration of support device 300 that is used with being connected to PLC 100 according to the present embodiment. Support device 300 is typically implemented by a general-purpose computer.

Referring to FIG. 5, support device 300 includes a CPU 302 that executes various programs including an OS, a read only memory (ROM) 304 that stores BIOS and various data, a memory RAM 306 that provides a work area for storing data necessary for execution of a program by CPU 302, and a hard disk (HDD) 308 that stores a program to be executed by CPU 302 in a non-volatile manner. More specifically, hard disk 308 stores a support program 330 for implementing functions provided by support device 300.

Support device 300 further includes a keyboard 310 and a mouse 312 that receive user operation, and a monitor 314 that presents information to the user. Support device 300 further includes a communication interface (IF) 318 for communicating with PLC 100 (CPU unit 104) or the like.

Support program 330 and the like executed by support device 300 are typically distributed with being stored in an optical disc 332, which is an example of a computerreadable recording medium. The support program stored in optical disc 332 is read by an optical disc reading device 316 and then stored in hard disk 308 or the like. Alternatively, the program may be configured to be downloaded from an upper-level host computer or the like over the network.

E. Configuration of Database Device 400

Next, database device 400 according to the present embodiment will be described. For database device 400, a known configuration that provides a database may be employed. For such a database, any configuration such as a relational data type or an object data type may be employed. The configuration of database device 400 adheres to a general-purpose computer architecture, so that no detailed description of database device 400 will be given below.

Database device 400 receives a connection request or access request (SQL statement in the relational data type) front PLC 100, executes necessary processing, and returns, to PLC 100, a result of the processing or the like. Typically, in accordance with the SQL statement, processing of writing designated data to a designated location or range, processing of reading data stored in the designated location or range, or processing of deleting data stored the designated location or range is executed. According to an embodiment described below, database device 400 is of a relational data type, and the access request is an SQL statement.

In the above description, a configuration where database device 400 responsible for providing a database is provided has been given as an example, but it is not limited to such a configuration, and various configurations may be employed. That is, any configuration may be employed as long as the configuration has basic functions as a database such as a function of retaining data, a function of executing processing in response to the access request, and a function of returning a result of processing to a client. Therefore, a configuration where a single device includes not only a database function but also other functions, a configuration where a plurality of devices are linked to provide a single database function, or the like may be employed.

F. Database Access Function

Next, an example of how to implement a database access function provided by PLC 100 according to the present embodiment will be described.

Figure 6:
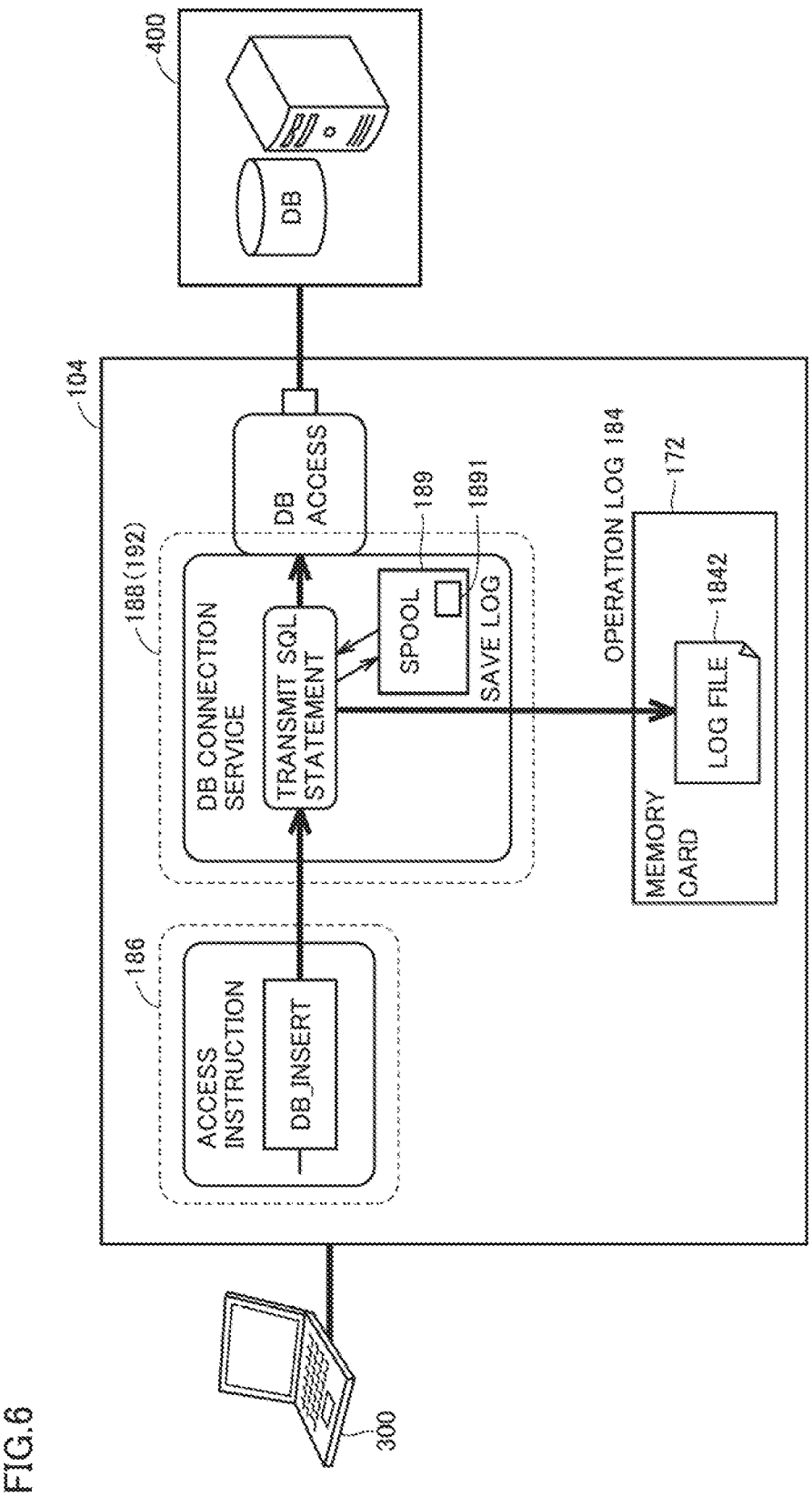
FIG. 6 is a schematic diagram for describing an example of how to implement an access request provided by the PLC according to the present embodiment.

FIG. 6 is a schematic diagram for describing an example of how to implement the access request provided by PLC 100 according to the present embodiment. FIG. 6 illustrates an example where an access instruction for accessing database device 400 is defined in user program 186. FIG. 6 illustrates a "DB_INSERT" instruction for inserting data into database device 400 as an example of the access instruction, but the access instruction is not limited to such an instruction, and any instruction including data to be transmitted to database device 400, information where the range of access to data of database device 400 is designated (access range), or the like may be designated. As described above, the access instruction includes information where the access range for accessing database device 400 is designated.

Typically, the user operates support device 300 to designate the DB access instruction (DB_INSERT) in user program 186. When user program 186 is executed and it is time to execute the DB access instruction, corresponding instruction code of DB access processing library 191 (FIG. 4) is called to generate an SQL statement including the access request for database device 400 and transmit the SQL statement. That is, a DB connection service implemented by DB access processing library 191 included in system program 188 is provided, and the DB connection service is triggered by the execution of the DB access instruction in user program 186. Then, the DB connection service generates an SQL statement and transmits the SQL statement thus generated to the database device via a driver software provided for the database device. Specifically, the DB access function transmits the SQL statement generated by the DB connection service to database device 400 over network 112 by using upper-level communication controller 160 (FIG. 3) and DB access processing library 191 (FIG. 4).

Upon receipt of the SQL statement from PLC 100, database device 400 executes processing in accordance with the SQL statement and returns, if necessary, a result of the processing to PLC 100.

In response to the execution of the processing, the DB connection service associates the content of the processing with the time information (that is, as an execution log) and writes the content of the processing to operation log 184. That is, a log of the operation status of PLC 100 is saved. When the DB connection service generates and transmits the SQL statement in response to the execution of the access instruction, the content of the SQL statement is written to operation log 184. In the example illustrated in FIG. 6, the DB connection service updates a log file 1842 stored in memory card 172 by adding operation log 184 to log file 1842.

When an error occurs in access to database device 400 by the DB connection service, a log including an SQL statement used when the access to database device 400 has failed (hereinafter referred to as a "failure log 1891") is stored in a spool 189. Then, the DB connection service reads the SQL statement stored in the spool and retransmits the SQL statement to database device 400. At this time, it is possible to select the SQL statement to be retransmitted to database device 400 with user program 186 or a tool provided by support device 300. Failure log 1891 is an error list including access requests recorded when the access to database device 400 fails.

The spool is not limited to a spool provided in CPU unit 104, and the spool may be provided outside CPU unit 104 (outside PLC 100). The error list including failure log 1891 may be stored in memory card 172. In the following, a storage domain (spool or memory card) where failure log 1891 is stored is referred to as a "storage location".

Support device 300 has a function of checking the content of operation log 184, and when any error occurs, the user can use the function of support device 300 to check the cause and details of the error.

G. Issue for Recovery from Error in order to make recovery from an error in access to database device 400, retransmission of an SQL statement stored in the storage location (for example, the spool) is a possible solution. When SQL statements stored in the storage location are transmitted in one batch, unintended processing may be executed. Suppose that the processing of inserting data into database device 400 fails multiple times, for example. In this case, when the SQL statements stored in the storage location are transmitted in one batch, the same data may be inserted into database device 400. In view of the fact that there may be a case where such batch retransmission of the SQL statements is not suitable, it is preferable that user program 186 have a function of retransmitting only a designated SQL statement implemented therein.

When the function of retransmitting only a designated SQL statement is not implemented in user program 186, the user needs to refer to the log file (or failure log file) to extract an SQL statement used when an error occurs. This, however, requires the user to spend his/her time and effort to extract such an SQL statement from the log. Furthermore, with only the function of extracting an SQL statement from the log file, the user cannot additionally transmit any desired SQL statement to database device 400 via the DB connection service.

Further, when the storage location is the spool, and the capacity of the spool is small, a limitation is imposed on the number of SQL statements that the spool can store. Therefore, there is a possibility that an SQL statement that the user wants to execute has not been stored in the spool.

According to the present embodiment, access processing unit 4 illustrated in FIG. 1 extracts an access request satisfying a prescribed condition from the error list including access requests recorded when access to database device 400 fails. Then, access processing unit 4 causes communication interface 6 to retransmit the access request thus extracted. This allows only the SQL statement satisfying the condition to be retransmitted to database device 400, thereby allowing a controller capable of making flexible recovery from an error in connection to database device 400 to be implemented. The retransmission of an SQL statement according to the present embodiment will be described in detail below.

Figure 7:
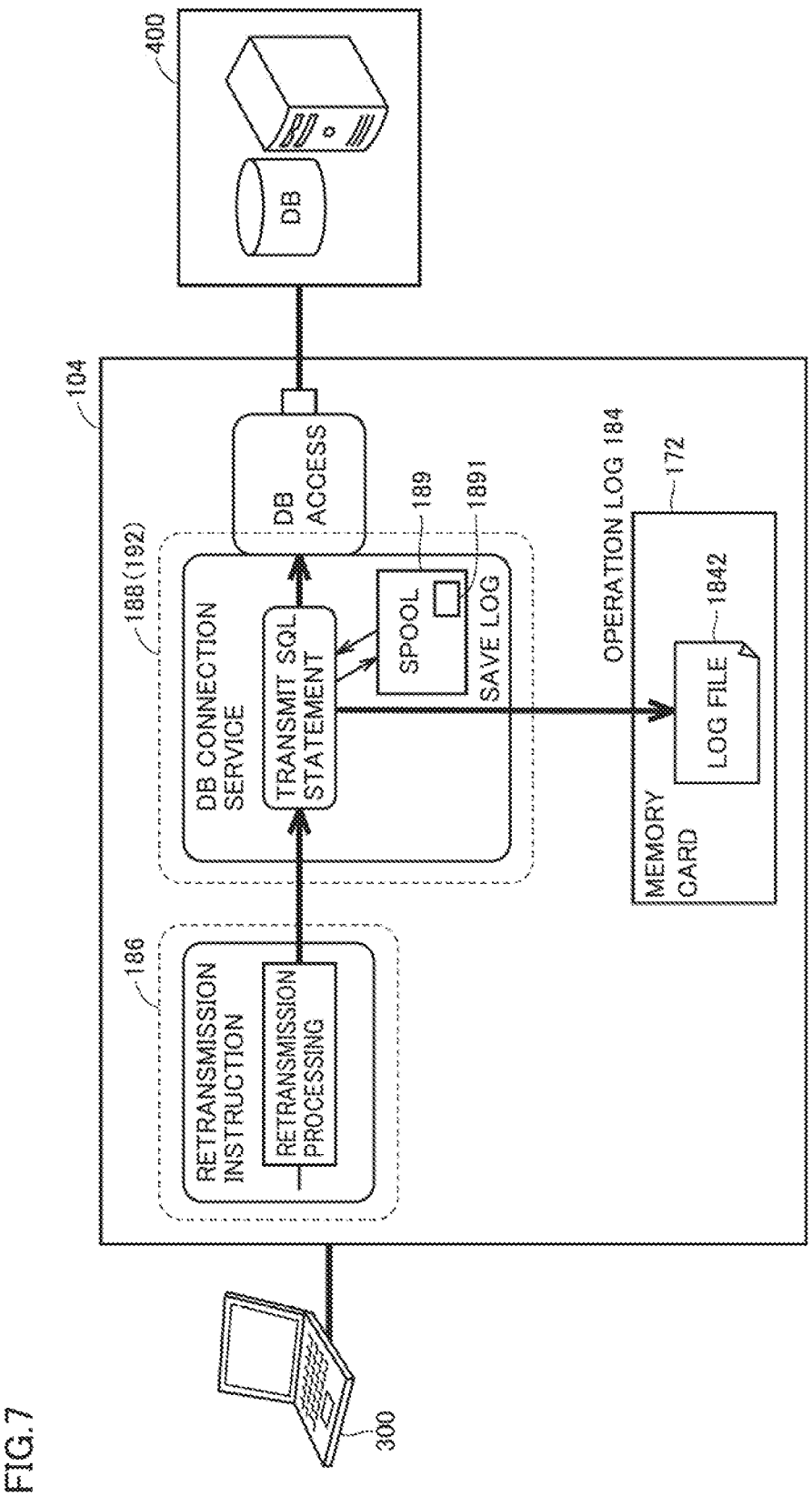
FIG. 7 is a diagram schematically illustrating how to retransmit an SQL statement according to a first aspect of the present embodiment.

H. Retransmission of SQL Statement According to First Aspect of Present Embodiment FIG. 7 is a diagram schematically illustrating how to retransmit an SQL statement according to the first aspect of the present embodiment. According to the first aspect, user program 186 identifies an SQL statement satisfying a designated condition, and instructs the DB connection service to extract the SQL statement thus identified from the log file or spool and retransmit the SQL statement. The selection of an SQL statement by user program 186 is made, for example, while PLC 100 is in operation.

Figure 8:
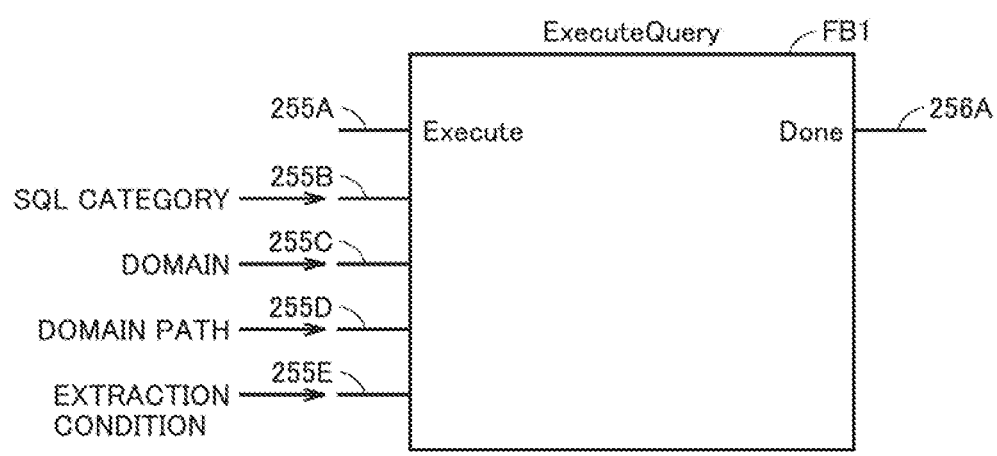
FIG. 8 is a diagram illustrating an example of a first function block included in a user program.

Referring to FIG. 8, a description will be given of the configuration of user program 186 for processing of retransmitting an SQL statement and details of the processing. FIG. 8 is a diagram illustrating an example of a first function block FB1 included in user program 186. Hereinafter, function block FB1 is also referred to as a block FB1.

A program having the function of block FB1 may be defined by other than the function block. Examples of block FB1 may include a block defined in a ladder diagram, and a block defined in any one of an instruction list, a structured text, or a sequential function chart, or a combination thereof. The examples of block FB1 may further include a block defined in a general-purpose programming language such as JavaScript (registered trademark) or C language.

Block FB1 is a program for executing an instruction that controls access to database device 400. More specifically, block FB1 is a program having a function of instructing a DB connection program to retransmit an SQL statement used when an error occurs in access to database device 400.

Block FB1 includes input parts 255A to 255E that receive settings for the retransmission of an SQL statement, and an output part 256A that outputs an instruction for retransmitting an SQL statement.

Input pan 255A denoted as "Excute" receives a setting for determining whether to execute the processing of retransmitting an SQL statement. As an example, input part 255A is designed to receive input of a "BOOL" type. As long as "FALSE" is input to input part 255A, an SQL statement is not retransmitted. On the other hand, when "TRUE" is input to input part 255A, the processing of retransmitting an SQL statement is executed.

Input parts 255B, 255C, 255D, 255E receive an SQL category, a domain, a domain path, and an extraction condition, respectively. Upon completion of the processing, a signal indicating the instruction for extracting SQL statement satisfying the extraction condition from the domain is output from output part 256A denoted as "Done".

FIG. 9 is a diagram illustrating information input to the function block illustrated in FIG. 8. FIG. 9 illustrates examples of SQL categories, domains, domain paths, and extraction conditions. The present embodiment, however, is not limited to the example illustrated in FIG. 9.

Figure 10:
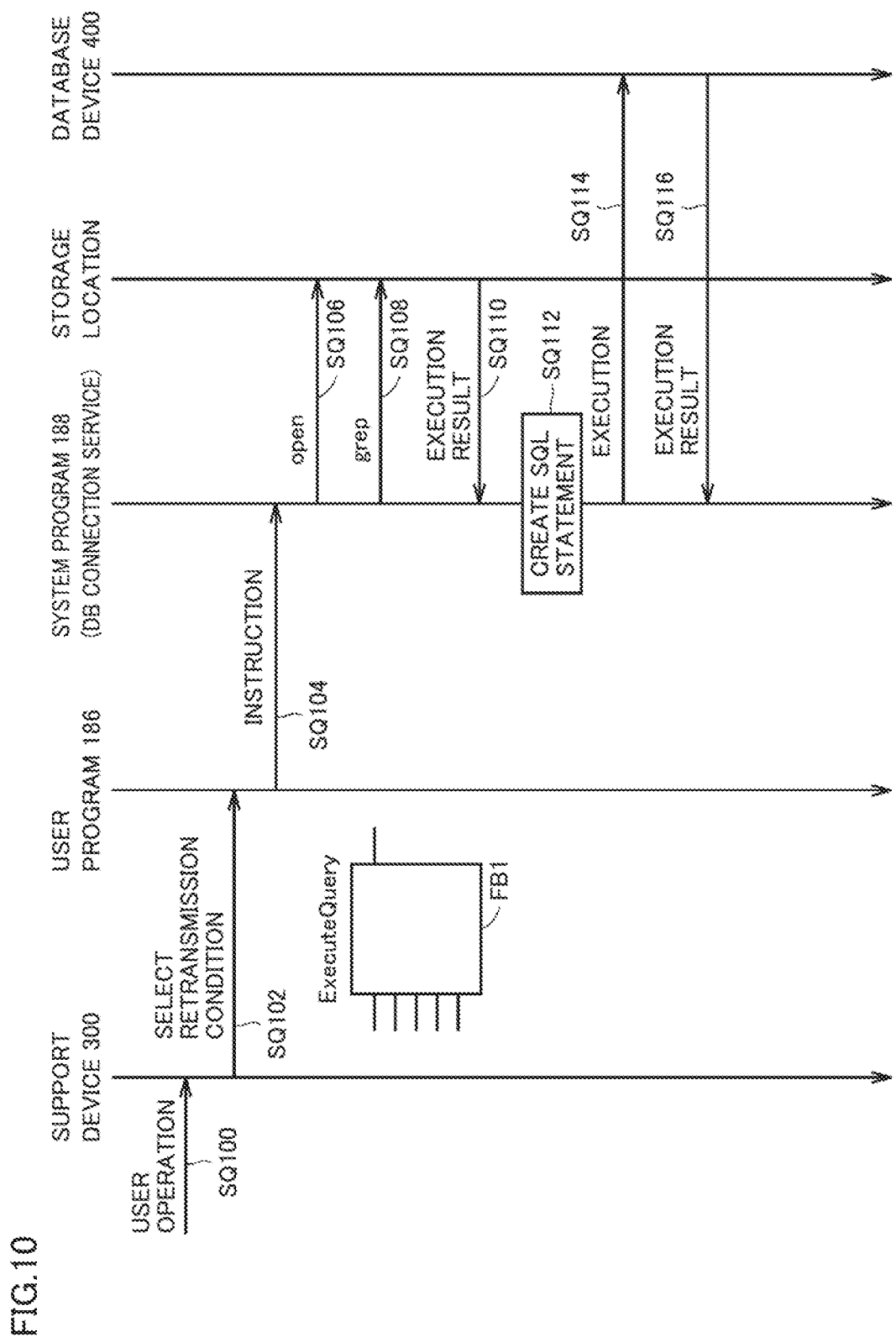
FIG. 10 is a sequence diagram illustrating a sequence of processing of retransmitting the SQL statement according to the first aspect of the present embodiment

FIG. 10 is a sequence diagram illustrating a sequence of the processing of retransmitting the SQL statement according to the first aspect of the present embodiment. The sequence diagram illustrated in FIG. 10 shows not only internal processing of PLC 100 but also communications with support device 300 and database device 400.

At appropriate timing, the user operates support device 300 to select a retransmission condition (sequence SQ100). The user operates support device 300 to select a retransmission condition to be passed to user program 186 (sequence SQ102). Specifically, the user uses support device 300 to select an SQL category, a domain, a domain path, and an extraction condition. Support device 300 transmits information selected by the user to PLC 100.

Subsequently, PLC 100 executes user program 186. At this time, the input parts of function block FB1 receive the information (the SQL category, the domain, the domain path, and the extraction condition) from support device 300. An instruction for re-executing a corresponding SQL statement is transmitted from the output part of function block FB1 to system program 188 (DB connection service) (sequence SQ104).

The DB connection service issues an open command in response to the instruction from user program 186 to open the error list (failure log file) stored in the storage location such as the spool (sequence SQ106). Next, the DB connection service issues a grep command to search the error list for logs including a character string that matches with the extraction condition (sequence SQ108). As a result, the DB connection service receives a result of executing the grep command from the storage location (sequence SQ110). The following describes a case where a log including a corresponding SQL statement is found in the error list.

The DB connection service creates an SQL statement to be retransmitted based on the SQL statement included in the extracted log (sequence SQ112). The DB connection service transmits the SQL statement to database device 400 to make access to database device 400 (sequence SQ114). Database device 400 executes processing in accordance with the received access request and returns the execution result to the DB connection service (sequence SQ116).

As described above, according to the first aspect, user program 186 (instruction execution unit 2) instructs, in response to the input from the user for the settings of the prescribed condition, access processing unit 4 (DB connection service) to extract the access request (SQL statement) satisfying the condition. This allows only the SQL statement designated by the user to be extracted from the failure log and thus allows only the processing associated with the SQL to be re-executed.

Figure 11:
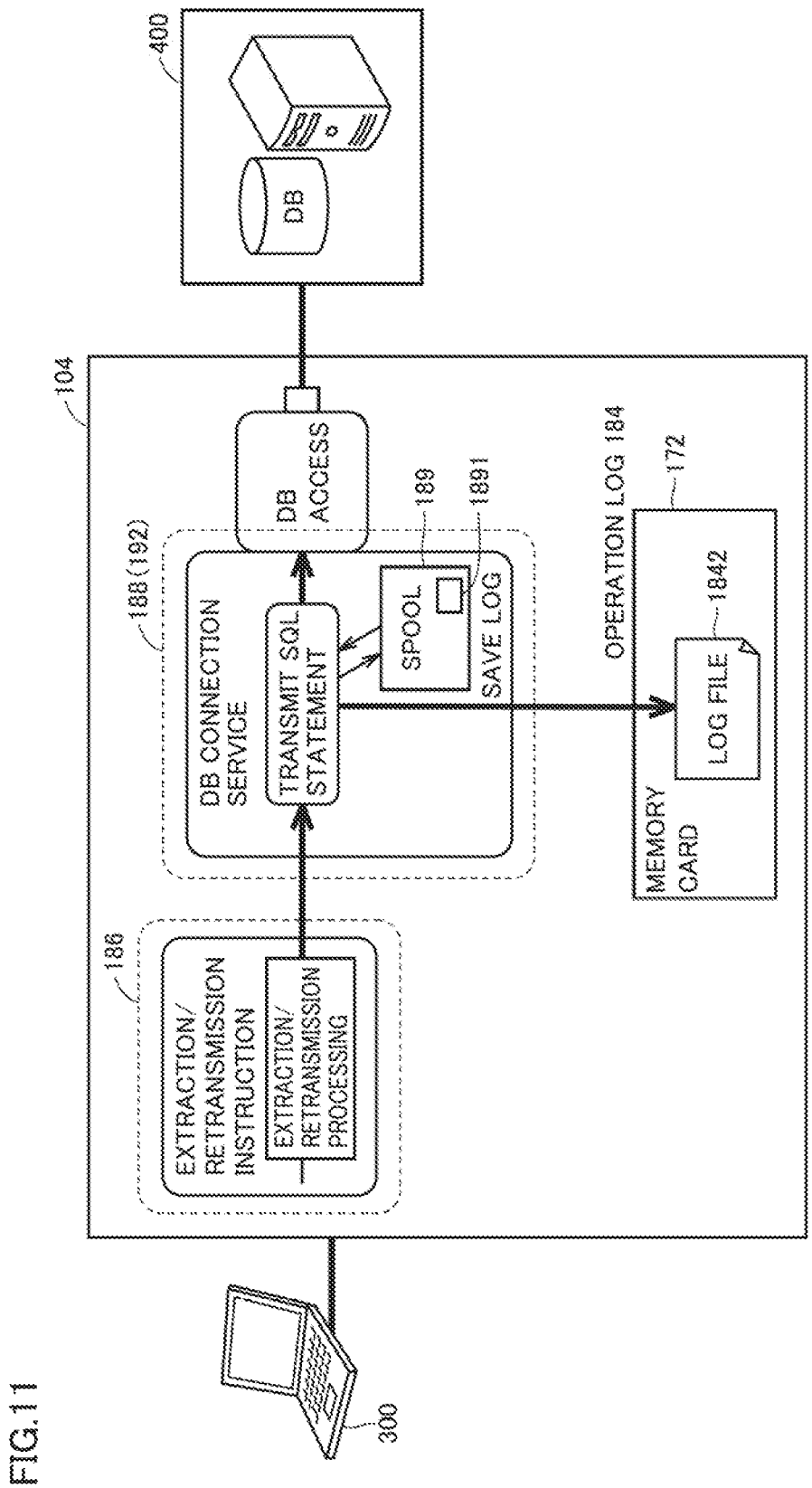
FIG. 11 is a diagram schematically illustrating how to retransmit an SQL statement according to a second aspect of the present embodiment.

I. Retransmission of SQL Statement According to Second Aspect of Present Embodiment FIG. 11 is a diagram schematically illustrating how to retransmit an SQL statement according to the second aspect of the present embodiment. According to the second aspect, user program 186 extracts a log including an SQL statement satisfying a designated condition from failure log 1891 stored in spool 189. User program 186 executes processing of displaying the log on support device 300.

Support device 300 executes tool software to display information included in the log. The user selects an SQL statement to be retransmitted from the information thus displayed. Support device 300 receives the input from the user and transmits, to user program 186, a command for retransmitting an SQL statement. User program 186 identifies an SQL statement satisfying the designated condition, and instructs the DB connection service to extract the SQL statement thus identified from the log file or spool and retransmit the SQL statement. The retransmission of an SQL statement using the tool may be executed, for example, upon startup of PLC 100 or during maintenance of PLC 100.

Figure 12:
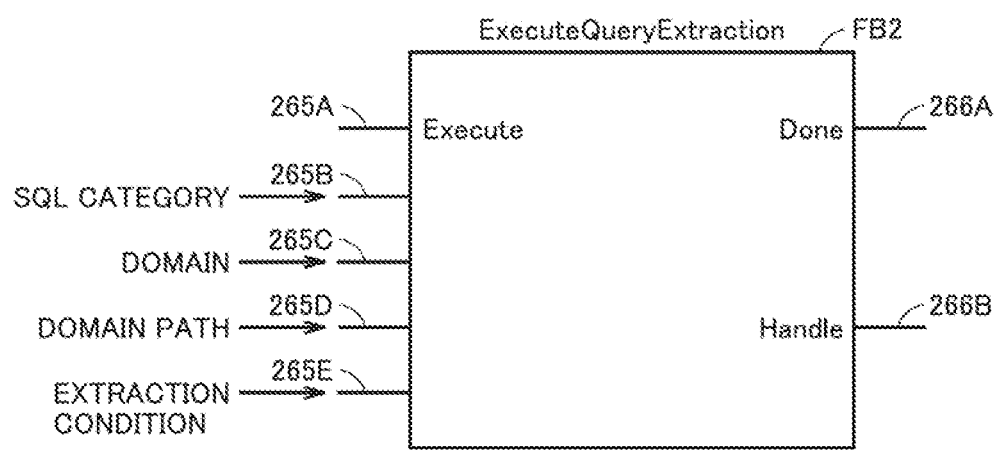
FIG. 12 is a diagram illustrating an example of a second function block included in the user program.
Figure 13:
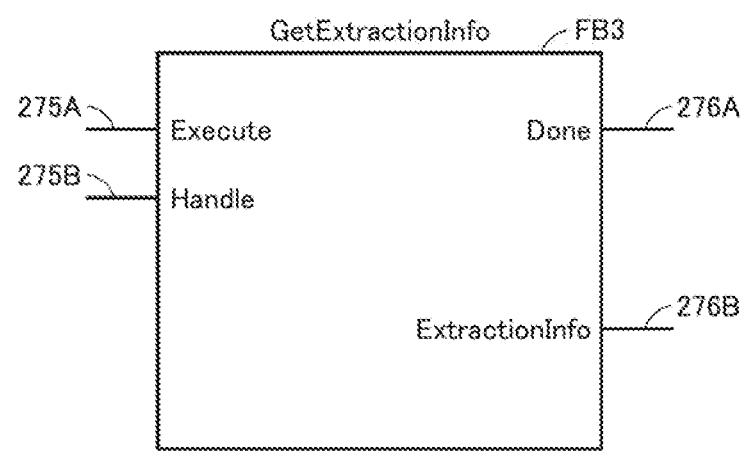
FIG. 13 is a diagram illustrating an example of a third function block included in the user program.
Figure 14:
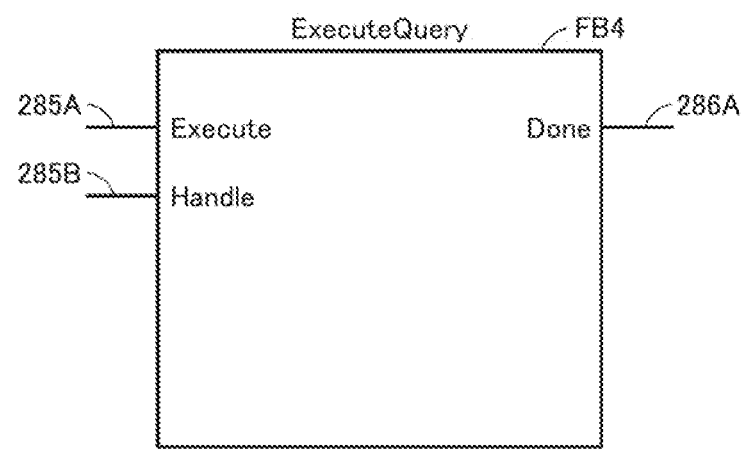
FIG. 14 is a diagram illustrating an example of a fourth function block included in a user program 186.

Referring to FIGS. 12 to 14, a description will be given of the configuration of user program 186 for processing of extracting an SQL statement and details of the processing. FIG. 12 is a diagram illustrating an example of a second function block FB2 included in user program 186. Hereinafter, function block FB2 is also referred to as a block FB2.

Block FB2 is a program having a function of instructing the DB connection service to extract an SQL statement to be retransmitted. Block FB2 includes input parts 265A to 265E that receive settings for the extraction of an SQL statement and output parts 266A, 266B that output an instruction for extracting an SQL statement. As with block FB1, input part 255A denoted as "Excute" receives a setting for determining whether to execute the processing of retransmitting an SQL statement. As an example, input part 265A is designed to receive input of a "BOOL" type. As long as "FALSE" is input to input part 265A, an SQL statement is not extracted. On the other hand, when "TRUE" is input to input part 265A, the processing of extracting an SQL statement is executed.

Input parts 265B, 265C, 265D, 265E receive an SQL category, a domain, a domain path, and an extraction condition, respectively. Upon completion of the processing, a signal indicating the instruction for extracting SQL satisfying the extraction condition from the domain is output from output part 266A denoted as "Done". Further, a handle value is output from output part 266B denoted as "Handle".

FIG. 13 is a diagram illustrating an example of a third function block FB3 included in user program 186. Hereinafter, function block FB3 is also referred to as a block FB3.

Block FB3 is a program having a function of executing processing necessary for displaying a failure log extracted from the storage location on support device 300. Block FB3 includes input parts 275A, 275B that receive settings for data acquisition, an output pan 276A that outputs an instruction for creating a list of acquired data, and an output part 276B that outputs extracted data. Input pan 275A denoted as "Excute" receives a setting for determining whether to create the list of data. As an example, input part 275A is designed to receive input of a "BOOL" type. As long as "FALSE" is input to input part 275A, the list of data is not created. On the other hand, when "TRUE" is input to input part 275A, the list of data list is created. Input part 275B denoted as "Handle" receives the handle value from block FB2.

Upon completion of the processing, a signal indicating the instruction for creating the list of data is output from output part 276A denoted as "Done". Further, information necessary for creating the list is output from output part 276B denoted as "ExtractionInfo".

FIG. 14 is a diagram illustrating an example of a fourth function block FB4 included in user program 186. Hereinafter, function block FB4 is also referred to as a block FB4.

As with block FB1, block FB4 is a program having a function of instructing the DB connection program to retransmit an SQL statement used when an error occurs in access to database device 400. Block FB4 includes input parts 285A, 285B that receive settings for retransmitting an SQL statement, an output part 286A that outputs an instruction for creating a list of acquired data, and an output part 286B that outputs an instruction for retransmitting an SQL statement.

Input part 285A denoted as "Excute" receives a setting for determining whether to execute the processing of retransmitting an SQL statement. As an example, input part 285A is designed to receive input of a "BOOL" type. As long as "FALSE" is input to input part 285A, an SQL statement is not retransmitted. On the other hand, when "TRUE" is input to input part 285A, the processing of retransmitting an SQL statement is executed. Input part 285B denoted as "Handle" receives the handle value from block FB2.

Upon completion of the processing, a signal indicating the instruction for retransmitting an SQL statement satisfying the extraction condition is output from output part 286A denoted as "Done".

Figure 15:
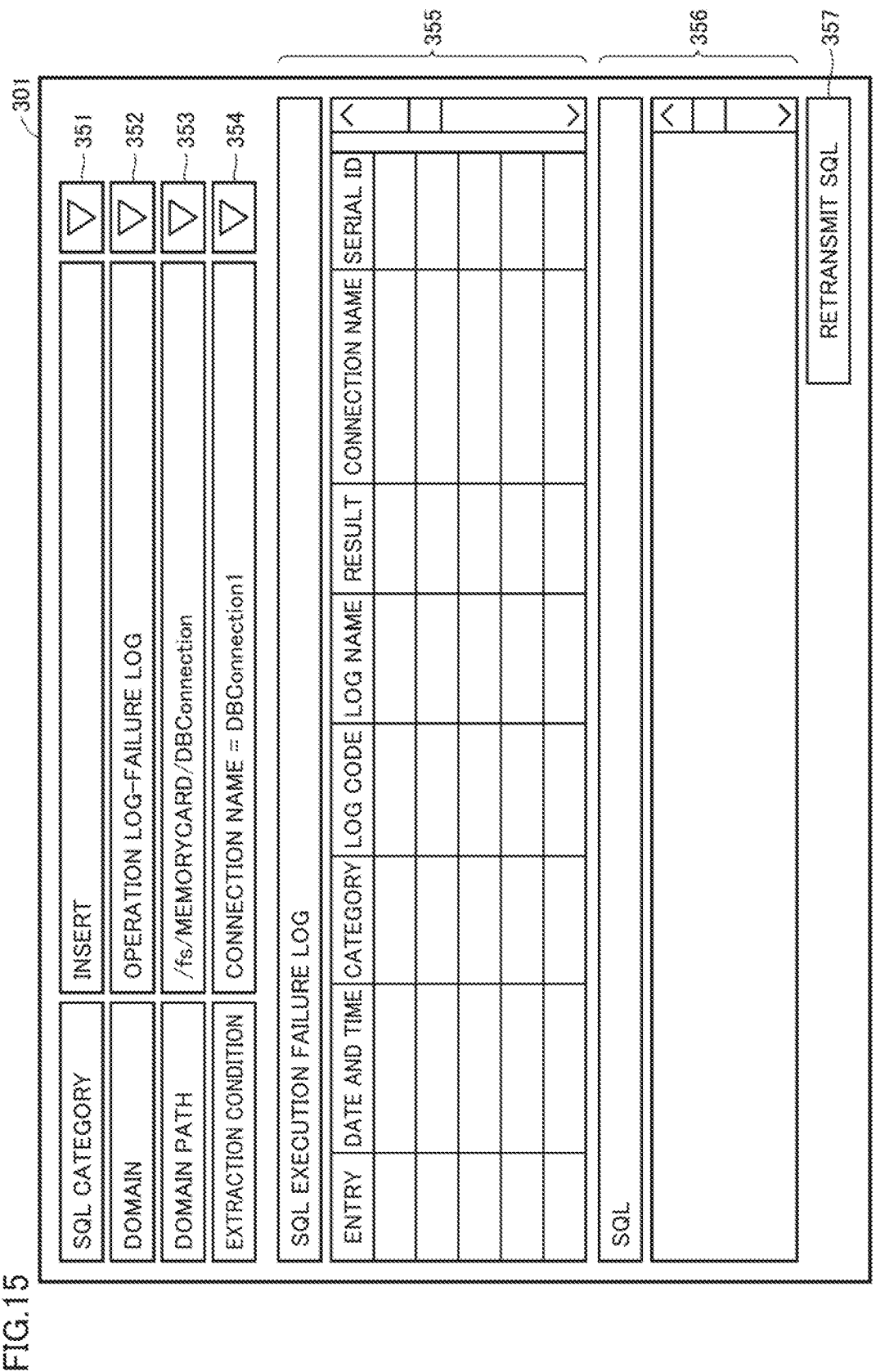
FIG. 15 is a diagram illustrating an example of a screen of a tool for receiving an SQL statement selected by a user.

FIG. 15 is a diagram illustrating an example of a screen of a tool for receiving an SQL statement selected by the user. Referring to FIG. 15, support device 300 executes the tool program to display the screen illustrated in FIG. 15 on support device 300. A tool 301 includes an SQL category selection field 351, a domain selection field 352, a path selection field 353, and an extraction condition selection field 354.

SQL category selection field 351, domain selection field 352, path selection field 353, and extraction condition selection field 354 are each operated by the user. SQL category selection field 351 has a function of selecting the type of an SQL category (SQL command). Domain selection field 352 has a function of selecting a domain where the failure log is stored. Path selection field 353 has a function of selecting a domain path selected by domain selection field 352. Extraction condition selection field 354 has a function of selecting a condition for an SQL statement to be extracted. In the example illustrated in FIG. 15, an SQL category ("INSERT"), a domain ("operation log-failure log"), a domain path ("/fs/MEMORYCARD/DBConnection"), and an extraction condition ("connection name=DBConnection1")) are selected.

Tool 301 further includes an SQL execution failure log display field 355. SQL execution failure log display field 355 displays information included in the failure log in list form, items displayed on SQL execution failure log display field 355 include, for example, an entry, a date and time, an SQL category, a log code, a log name, an execution result, a connection name, a serial ID, and the like. When the user operates SQL execution failure log display field 355, a log including the SQL statement to be retransmitted out of the logs displayed on SQL execution failure log display field 355 is highlighted and selected.

Tool 301 further includes an SQL display field 356 and an SQL retransmission button 357. SQL display field 356 displays the SQL statement included in the failure log selected from the logs displayed on SQL execution failure log display field 355 SQL retransmission button 357 receives user operation. When SQL retransmission button 357 is operated, tool 301 transmits, to user program 186, the instruction for retransmitting the SQL statement displayed on SQL display field 356 to database device 400.

Figure 16:
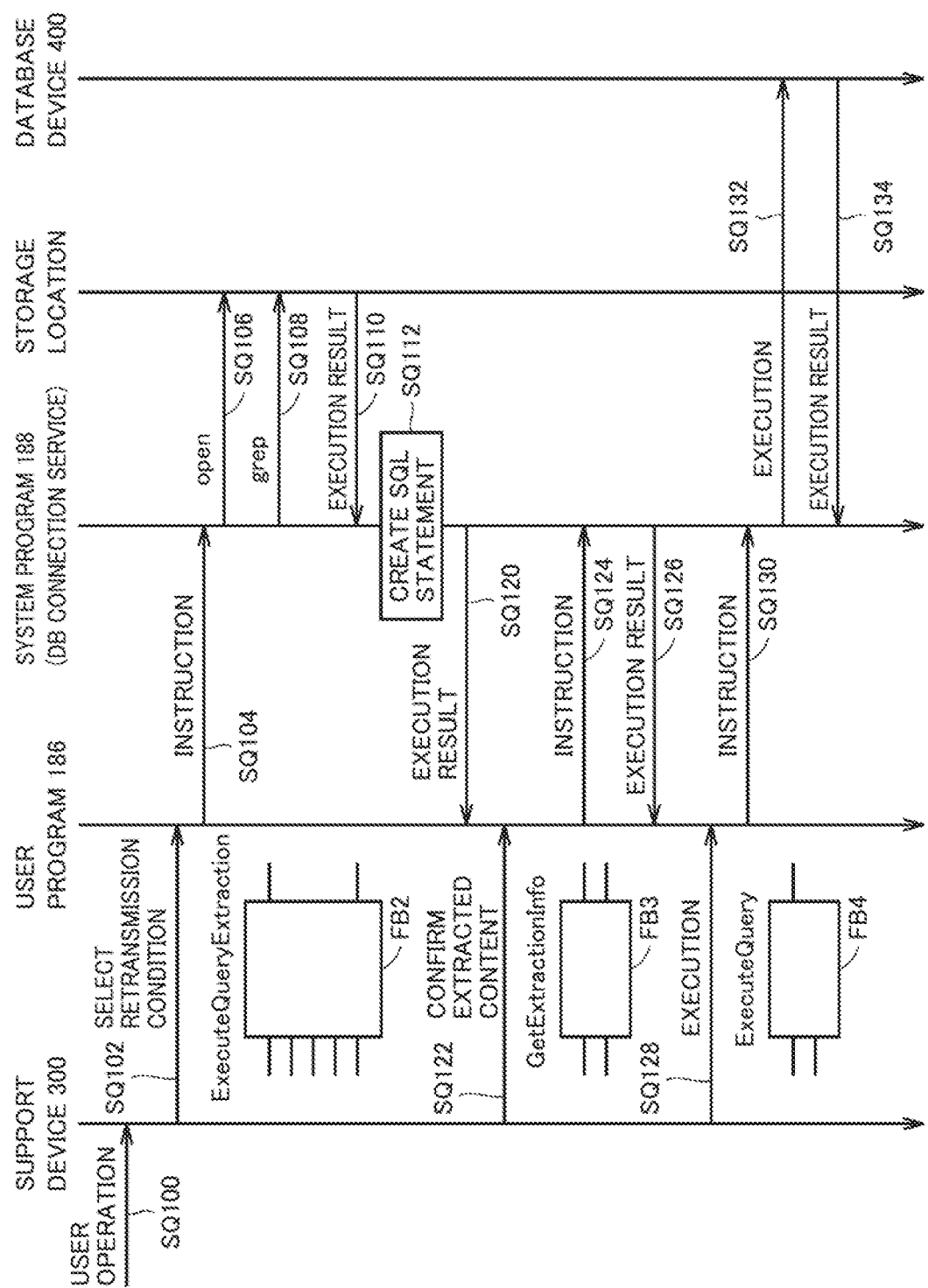
FIG. 16 is a sequence diagram illustrating a sequence of processing of retransmitting the SQL statement according to the second aspect of the present embodiment.

FIG. 16 is a sequence diagram illustrating a sequence of processing of retransmitting an SQL statement according to the second aspect of the present embodiment. As with the first aspect, at appropriate timing, the user operates support device 300 to select a retransmission condition (sequence SQ100). The user operates support device 300 to select a retransmission condition to be passed to user program 186 (sequence SQ102). Specifically, the user uses support device 300 to select an SQL category, a domain, a domain path, and an extraction condition. Support device 300 transmits information selected by the user to PLC 100.

Subsequently, PLC 100 executes user program 186. At this time, the input parts of function block FB2 receive the information (the SQL category, the domain, the domain path, and the extraction condition) from support device 300. An instruction for extracting the corresponding SQL statement is transmitted from the output part of function block FB2 to system program 188 (DB connection service) (sequence SQ104).

The DB connection service issues an open command in response to the instruction from user program 186 to open the error list (failure log file) stored in the storage location such as the spool (sequence SQ106). Next, the DB connection service issues a grep command to search the error list for logs including a character string that matches with the extraction condition (sequence SQ108). As a result, the DB connection service receives a result of executing the grep command from the storage location (sequence SQ110). The following describes a case where a log including a corresponding SQL statement is found in the error list.

The DB connection service creates an SQL statement from the extracted log (sequence SQ112). Next, the DB connection service transmits the execution result to user program 186 (sequence SQ120).

Support device 300 transmits an instruction for confirming the extracted content to user program 186 in response to user operation (sequence SQ122). In accordance with the instruction, user program 186 (function block FB3) transmits an instruction for displaying the extracted information to the DB connection service (sequence SQ124).

The DB connection service transmits the execution result to user program 186 in accordance with the instruction. As a result, user program 186 acquires the extracted information (sequence SQ126). Support device 300 executes the program of tool 301 to display the extracted information.

The user operates tool 301 to select the SQL statement to be retransmitted. Support device 300 instructs PLC 100 to retransmit the SQL statement. This causes function block FB4 to instruct the DB connection service to retransmit the SQL statement (sequence SQ130). The DB connection service transmits the SQL statement to database device 400 to make access to database device 400 (sequence SQ132). Database device 400 executes processing in accordance with the received access request and returns the execution result to the DB connection service (sequence SQ134).

As described above, according to the second aspect, user program 186 (instruction execution unit 2) executes user program 186 (blocks FB2, FB3) to display information indicating the access request (SQL statement) extracted from the error list by access processing unit 4 (DB connection service). User program 186 (instruction execution unit 2) instructs access processing unit 4 (DB connection service) to retransmit, to communication interface 6, the access request selected by the user in response to the input from the user for selection of the access request. It is therefore possible, as in the first aspect, to extract only the SQL statement designated by the user from the failure log and re-execute only the processing associated with the SQL.

J. Prevention of Wrong Retransmission

When the user is allowed to select the SQL statement to be retransmitted to database device 400, the user may operate the tool so as to transmit the same SQL statement to database device 400 multiple times. In this case, the same processing on database device 400 may be repeated multiple times. For example, the same data is inserted into database device 400 multiple times. Therefore, when the processing executed on database device 400 in response to the retransmission of the SQL statement results in success, it is preferable that the same SQL statement be prevented from being further transmitted to the database device (prevent wrong retransmission of the SQL statement).

Figure 17:
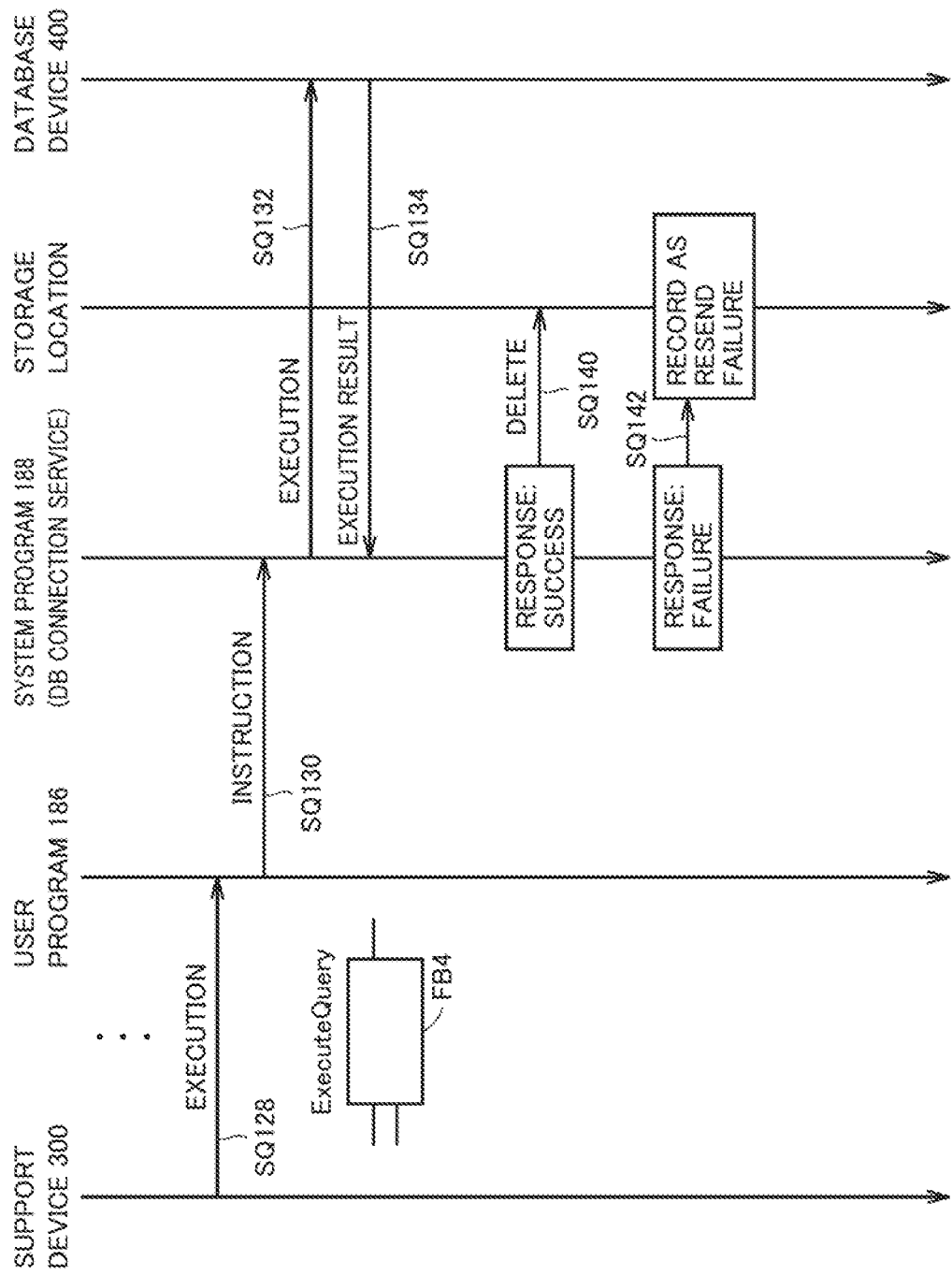
FIG. 17 illustrates a sequence of processing of preventing wrong retransmission of the SQL statement according to the present embodiment.

FIG. 17 illustrates a sequence of processing of preventing wrong retransmission of the SQL statement according to the present embodiment. Referring to FIG. 17, the sequences prior to sequence SQ128 are the same as the corresponding sequences illustrated in FIG. 16. Sequences SQ132, SQ134 are also the same as the corresponding sequences illustrated in FIG. 16.

Upon receipt of the execution result from database device 400, the DB connection service checks a response from database device 400. When the DB connection service receives a response indicating that the connection to database device 400 has been successfully made, a corresponding log (access request including the SQL statement) is deleted from the list of failure logs stored in the storage location (sequence SQ140). Alternatively, in sequence SQ140, processing of making the corresponding SQL statement invalid may be executed. For example, a flag associated with the SQL statement may be set at a value indicating successful retransmission.

On the other hand, when the DB connection service receives a response indicating that the connection to database device 400 has failed, information indicating that the retransmission of the corresponding SQL statement (RE-SEND command) has failed is generated and stored in the storage location (sequence SQ142). This allows the SQL statement to be retransmitted until the connection to database device 400 becomes normal.

As described above, according to this embodiment, it is possible to select the SQL statement to be retransmitted from the log (failure log) including the SQL statement used when the access to database device 400 fails. It is therefore possible to make flexible recovery from an error in connection to database device 400.

K. Appendix

As described above, the present embodiment includes the following disclosure.
(Configuration 1)
A controller (100) for controlling a control object, includes:
a communication interface (6) configured to access a database device (400);
an instruction execution unit (2) configured to execute a user program (186) including an access instruction for accessing the database device (400), the user program (186) being associated with control of the control object; and an access processing unit (4) configured to generate an access request in response to execution of the access instruction by the instruction execution unit (2) and cause the communication interface (6) to transmit the access request, and the access processing unit (4) extracts an access request satisfying a prescribed condition from an error list including access requests recorded when access to the database device (400) fails and causes the communication interface (6) to retransmit the access request thus extracted.

(Configuration 2)

In the controller (100) according to configuration 1, the instruction execution unit (2) instructs, in response to input from a user for settings of the prescribed condition, the access processing unit (4) to extract the access request satisfying the prescribed condition.

(Configuration 3)

In the controller (100) according to configuration 1, the instruction execution unit (2) executes the user program (186) designed to display information indicating the access request extracted from the error list by the access processing unit (4), and instructs, in response to input from a user for selection of the access request, the access processing unit (4) to cause the communication interface (6) to retransmit the access request selected by the user.

(Configuration 4)

In the controller (100) according to any one of configurations 1 to 3, when the communication interface (6) successfully retransmits the access request, the access processing unit (4) deletes the access request from the enoi list.

(Configuration 5)

In the controller (100) according to configuration 4, when the communication interface (6) fails to retransmit the access request, the access processing unit (4) generates information on the failure of the retransmission.

(Configuration 6)

A control system includes:

a controller (100) according to any one of configurations 1 to 5; and a database device (400) configured to receive an access request from the controller (100).

(Configuration 7)

A control method to be executed by a controller (100) for controlling a control object, includes:

executing, by the controller (100), an access instruction for accessing a database device (400);

generating, by the controller (100), an access request;

transmitting, by the controller (100), the access request to the database device (400);

storing, by the controller (100), an access request used when access to the database device (400) fails in an error list;

extracting, by the controller (100), an access request satisfying a prescribed condition from the error list; and retransmitting, by the controller (100), the access request extracted to the database device (400).

It should be understood that the embodiments disclosed herein are illustrative in all respects and not restrictive. The scope of the present invention is defined by the claims rather than the above description and is intended to include the claims, equivalents of the claims, and all modifications within the scope.

REFERENCE SIGNS LIST

1: control system, 2: instruction execution unit, 4: access processing unit, 6: communication interface, 10: detection switch, 20: relay, 30: servomotor driver, 32: motor, 100: PLC, 102: power supply unit, 104: CPU unit, 106: IO unit, 108: PLC system bus, 110: field bus, 112: network, 114: connection cable, 120: processor, 122: chipset, 124: system clock, 126: main memory, 128: non-volatile memory. 130: communication connector, 140: PLC system bus controller, 142, 152, 162: buffer memory, 144: PLC system bus control circuit, 146, 156, 166: DMA control circuit, 148: PLC system bus connector, 150: field bus controller, 154: field bus control circuit, 158: field bus connector, 160: upper-level communication controller, 164: upper-level communication control circuit, 168: upper-level communication connector, 170: memory card interface, 172: memory card, 180: OS, 182: data definition information, 184: operation log, 1842: log file, 186: user program, 188: system program, 189: spool, 1891: failure log, 190: sequence instruction library, 191: database (DB) access processing library, 192: monitoring processing library, 193: input/output processing library, 194: Tool interface processing program, 195: scheduler, 200: remote IO terminal, 202: communication coupler, 208: terminal bus, 255A to 255E, 265A to 265E, 275A, 275B, 285A, 285B: input part, 256A, 266A, 266B, 276A, 276B, 286A, 286B: output part, 300: support device. 301: tool, 302: CPU, 304: ROM, 306: RAM, 308: hard disk, 310: keyboard, 312: mouse, 314: monitor, 316: optical disc reading device, 330: support program, 332: optical disc, 351: category selection field, 352: domain selection field, 353: path selection field, 354: extraction condition selection field, 355: execution failure log display field, 356: SQL display field, 357: SQL retransmission button, 400: database device, FB1 to FB4: function block, SQ100 to SQ142: sequence.

The invention claimed is:

1. A controller for controlling a control object, comprising:
 a communication interface circuitry configured to access a database device;
 an instruction execution circuitry configured to execute a user program including an access instruction for accessing the database device, the user program being associated with control of the control object; and
 an access processing circuitry configured to generate an access request in response to execution of the access instruction by the instruction execution circuitry and cause the communication interface circuitry to transmit the access request,
 wherein the access processing circuitry stores an error list including access requests recorded when access to the database device fails into a memory, and
 wherein the instruction execution circuitry instructs, in response to input from a user for setting of an extraction condition, the access processing circuitry to extract the access request satisfying the extraction condition from the error list stored in the memory, and
 wherein the access processing circuitry searches the error list stored in the memory, extracts the access request including a character string matching with the extraction condition from the error list, and causes the communication interface to retransmit the access request extracted.

2. The controller according to claim 1, wherein the instruction execution circuitry executes the user program designed to display information indicating the access request extracted from the error list by the access processing circuitry, and instructs, in response to input from a user for selection of the access request, the access processing circuitry to cause the communication interface circuitry to retransmit the access request selected by the user.

3. The controller according to claim 2, wherein when the communication interface circuitry successfully retransmits the access request, the access processing circuitry deletes the access request from the error list stored in the memory.

4. The controller according to claim 3, wherein when the communication interface circuitry fails to retransmit the access request, the access processing circuitry generates information on the failure of the retransmission.

5. The controller according to claim 1, wherein when the communication interface circuitry successfully retransmits the access request, the access processing circuitry deletes the access request from the error list stored in the memory.

6. The controller according to claim 5, wherein when the communication interface circuitry fails to retransmit the access request, the access processing circuitry generates information on the failure of the retransmission.

7. The controller according to claim 1, wherein when the communication interface circuitry successfully retransmits the access request, the access processing circuitry deletes the access request from the error list stored in the memory.

8. The controller according to claim 7, wherein when the communication interface circuitry fails to retransmit the access request, the access processing circuitry generates information on the failure of the retransmission.

9. A control system comprising:
a controller for controlling a control object, the controller comprising
a communication interface circuitry configured to access a database device,
an instruction execution circuitry configured to execute a user program including an access instruction for accessing the database device, the user program being associated with control of the control object, and
an access processing circuitry configured to generate an access request in response to execution of the access instruction by the instruction execution circuitry and cause the communication interface circuitry to transmit the access request,
the access processing circuitry storing an error list including access requests recorded when access to the database device fails into a memory, wherein the instruction execution circuitry instructs, in response to input from a user for setting of an extraction condition, the access processing circuitry to extract the access request satisfying the extraction condition from the error list stored in the memory, and wherein the access processing circuitry searches the error list stored in the memory, extracts the access request including a character string matching with the extraction condition from the error list, and
causes the communication interface circuitry to retransmit the access request extracted; and the database device configured to receive the access request from the controller.

10. The control system according to claim 9, wherein the instruction execution circuitry executes the user program designed to display information indicating the access request extracted from the error list by the access processing circuitry, and instructs, in response to input from a user for selection of the access request, the access processing circuitry to cause the communication interface circuitry to retransmit the access request selected by the user.

11. The control system according to claim 10, wherein when the communication interface circuitry successfully retransmits the access request, the access processing circuitry deletes the access request from the error list stored in the memory.

12. The control system according to claim 11, wherein when the communication interface circuitry fails to retransmit the access request, the access processing circuitry generates information on the failure of the retransmission.

13. The control system according to claim 9, wherein when the communication interface circuitry successfully retransmits the access request, the access processing circuitry deletes the access request from the error list stored in the memory.

14. The control system according to claim 13, wherein when the communication interface circuitry fails to retransmit the access request, the access processing circuitry generates information on the failure of the retransmission.

15. The control system according to claim 9, wherein when the communication interface circuitry successfully retransmits the access request, the access processing circuitry deletes the access request from the error list stored in the memory.

16. The control system according to claim 15, wherein when the communication interface circuitry fails to retransmit the access request, the access processing circuitry generates information on the failure of the retransmission.

17. A control method to be executed by a controller for controlling a control object, the control method comprising:
executing, by the controller, an access instruction for accessing a database device;
generating, by the controller, an access request;
transmitting, by the controller, the access request to the database device;
storing, by the controller, an access request used when access to the database device fails in an error list into a memory;
searching, by the controller, the error list stored in the memory in response to input from a user for setting of an extraction condition;
extracting, by the controller, an access request including a character string matching with the extraction condition from the error list stored in the memory; and
retransmitting, by the controller, the access request extracted to the database device.

* * * * *